(12) United States Patent
Bhanage et al.

(10) Patent No.: US 9,467,873 B2
(45) Date of Patent: Oct. 11, 2016

(54) CHANNEL WIDTH CONFIGURATION BASED ON NETWORK CONDITIONS

(71) Applicant: Aruba Networks, Inc., Sunnyvale, CA (US)

(72) Inventors: Gautam D. Bhanage, Sunnyvale, CA (US); Sachin Ganu, San Jose, CA (US); Partha Narasimhan, Santa Clara, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 17 days.

(21) Appl. No.: 13/857,321

(22) Filed: Apr. 5, 2013

(65) Prior Publication Data

US 2014/0269280 A1    Sep. 18, 2014

Related U.S. Application Data

(60) Provisional application No. 61/793,179, filed on Mar. 15, 2013.

(51) Int. Cl.
| | |
|---|---|
| *H04L 12/801* | (2013.01) |
| *H04W 24/02* | (2009.01) |
| *H04W 72/04* | (2009.01) |
| *H04L 12/54* | (2013.01) |
| *H04W 84/12* | (2009.01) |
| *H04W 28/02* | (2009.01) |

(52) U.S. Cl.
CPC .............. *H04W 24/02* (2013.01); *H04L 47/10* (2013.01); *H04W 72/0486* (2013.01); *H04L 12/5695* (2013.01); *H04L 47/11* (2013.01); *H04L 47/15* (2013.01); *H04W 28/0289* (2013.01); *H04W 72/0453* (2013.01); *H04W 84/12* (2013.01)

(58) Field of Classification Search
CPC ... H04L 12/5695; H04L 47/10; H04L 47/11; H04L 47/15; H04L 47/822; H04L 47/824
USPC ............... 370/401, 252, 466; 455/456.5, 446
See application file for complete search history.

(56) References Cited

U.S. PATENT DOCUMENTS

| | | | |
|---|---|---|---|
| 8,509,071 B1 * | 8/2013 | Narayanaswamy | ........................ H04L 41/5025 370/230 |
| 8,787,841 B2 | 7/2014 | Ketchum et al. | |
| 2006/0020700 A1 * | 1/2006 | Qiu | ....................... H04L 12/5695 709/224 |
| 2006/0233131 A1 | 10/2006 | Gore et al. | |
| 2008/0080553 A1 | 4/2008 | Hasty et al. | |

(Continued)

*Primary Examiner* — Raj Jain
(74) *Attorney, Agent, or Firm* — Hewlett Packard Enterprise Patent Department

(57) ABSTRACT

A method includes determining an optimized channel width between client devices and access points based on network conditions in a wireless network. In particular, the channel widths may be optimized to reduce airtime usage on access points and eliminate a high density condition while the client devices are steered to access points that provide the greatest channel capacity gains based on signal-to-noise-ratios for each spatial stream in a beamformed transmission.

16 Claims, 4 Drawing Sheets

(56) References Cited

U.S. PATENT DOCUMENTS

| | | |
|---|---|---|
| 2009/0290518 A1 | 11/2009 | Gossain et al. |
| 2010/0202548 A1 | 8/2010 | Sanayei |
| 2011/0158190 A1 | 6/2011 | Kuwahara et al. |
| 2011/0188393 A1 | 8/2011 | Mallik et al. |
| 2012/0170471 A1 | 7/2012 | Brown et al. |
| 2013/0097309 A1* | 4/2013 | Ma ................ H04L 29/08099 709/224 |
| 2013/0100955 A1* | 4/2013 | Dunlap ................ H04L 47/20 370/392 |
| 2013/0176979 A1 | 7/2013 | Ohwatari et al. |
| 2013/0229307 A1 | 9/2013 | Chang et al. |
| 2014/0025796 A1* | 1/2014 | Vibhor ............... H04L 41/0889 709/222 |
| 2014/0059265 A1* | 2/2014 | Iyer ..................... G06F 9/5011 710/313 |
| 2014/0094164 A1 | 4/2014 | Hwang et al. |
| 2014/0269370 A1 | 9/2014 | Dharanipragada et al. |

\* cited by examiner

62

```
┌─────────────────────────────────────────┐
│ DETERMINE CHARACTERISTICS OF A PLURALITY OF │
│ CLIENT DEVICES CURRENTLY ASSOCIATED WITH ONE│
│ OF A PLURALITY OF ACCESS POINTS IN A NETWORK│
│                    63                       │
└─────────────────────────────────────────┘
                    │
                    ▼
┌─────────────────────────────────────────┐
│ BASED ON THE CHARACTERISTICS OF THE PLURALITY│
│ OF CLIENT DEVICES, DETERMINE CHANNEL WIDTHS OF│
│ WIRELESS CHANNELS TO BE USED BY ONE OR MORE │
│ ACCESS POINT OF THE PLURALITY OF ACCESS POINTS│
│ TO COMMUNICATE WITH ONE OR MORE ASSOCIATED  │
│               CLIENT DEVICES                │
│                    64                       │
└─────────────────────────────────────────┘
                    │
                    ▼
┌─────────────────────────────────────────┐
│   CONFIGURE ONE OR MORE ACCESS POINTS TO    │
│ PROVIDE NETWORK ACCESS TO AT LEAST ONE OF THE│
│  PLURALITY OF CLIENT DEVICES BASED ON THE   │
│         DETERMINED CHANNEL WIDTHS           │
│                    65                       │
└─────────────────────────────────────────┘
```

FIGURE 3B

CHANNEL WIDTH CONFIGURATION BASED ON NETWORK CONDITIONS

CROSS REFERENCE TO RELATED APPLICATIONS

This application claims priority under 35 U.S.C. §119 from U.S. Provisional Patent Application No. 61/793,179, entitled "Dynamic Access Point Configuration Based on Network Conditions," filed on Mar. 15, 2013, the entirety of which is incorporated herein by reference. This application is related to co-pending U.S. patent application Ser. No. 13/857,314, entitled "Dynamic Beamforming Configuration Based on Network Conditions," filed on Apr. 5, 2013, the entirety of which is incorporated herein by reference.

TECHNICAL FIELD

The present disclosure relates to configuring access points based on network conditions. In particular, the present disclosure relates to determining an optimized channel width between client devices and access points based on network conditions in a wireless network.

BACKGROUND

Over the past decade, there has been a substantial increase in the use and deployment of wireless network devices, from dual-mode smartphones to tablet devices capable of operating in accordance with a particular Institute of Electrical and Electronics Engineers (IEEE) standard. With "wireless" becoming the de-facto medium for connectivity among users, it has become increasingly important for access points to manage connections intelligently with a plurality of client devices to maintain high throughput and to avoid overprovisioning.

Currently, several variants of IEEE 802.11 standards support multiple channel widths and optional beamforming capabilities. Network administrators are often forced to painstakingly individually adjust these parameters to increase network performance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings:

FIGS. 3A and 3B show methods for adjusting channel widths between access points and client devices in accordance with one or more embodiments; and

DETAILED DESCRIPTION

Figure 1:
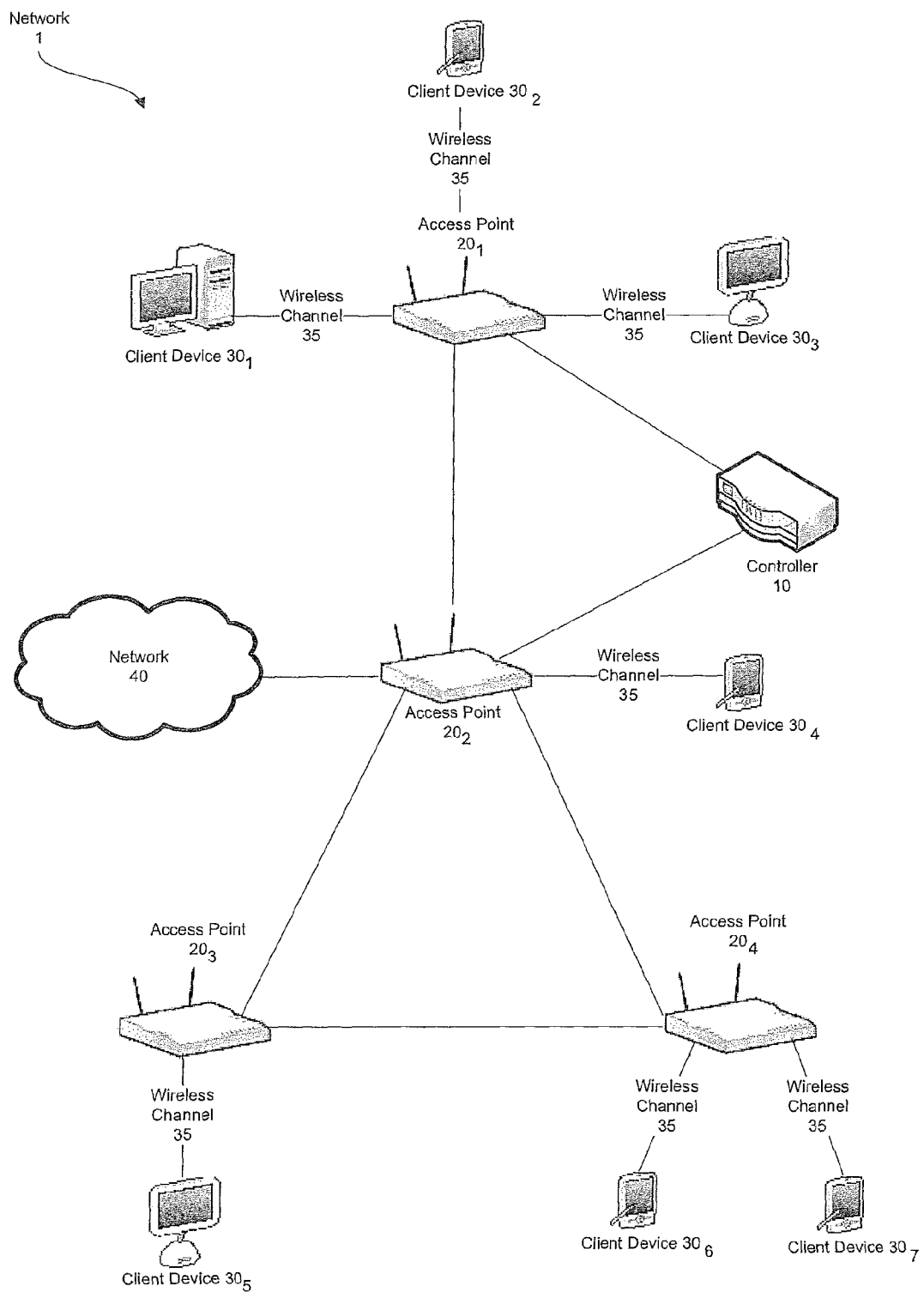
FIG. 1 shows a block diagram example of a network in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Herein, certain terminology is used to describe features for embodiments of the disclosure. For example, the term "digital device" generally refers to any hardware device that includes processing circuitry running at least one process adapted to control the flow of traffic into the device. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral, a printer, a mobile handset, a smartphone, a personal digital assistant "PDA", a wireless receiver and/or transmitter, an access point, a base station, a communication management device, a router, a switch, and/or a controller.

One type of digital device, referred to as an "access point," is a combination of hardware, software, and/or firmware that is configured to control at least (1) channel widths between access points and client devices and (2) beamforming characteristics between access points and client devices.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Architectural Overview

FIG. 1 shows a block diagram example of a network 1 in accordance with one or more embodiments. Network 1, as illustrated in FIG. 1, is a digital system that may include a plurality of digital devices such as controller 10, access points $20_1$-$20_4$ and one or more client devices $30_1$-$30_7$. The client devices 30 may include any set of devices that communicate wirelessly with access points 20 within network 1. In one or more embodiments, network 1 may include more or less devices than the devices illustrated in FIG. 1, which may be connected to other devices within network 1 via wired and/or wireless mediums.

In one embodiment, client devices 30 are digital devices that include a hardware processor, memory hierarchy, and input/output (I/O) interfaces including a wireless interface such as an IEEE 802.11 wireless interface. The wireless interface may be used to communicate with access points 20 and/or controller 10. Client devices 30 may include one or more antennas for establishing one or more concurrent spatial data streams with an access point 20. Client devices 30 may be wireless electronic devices capable of receiving video, voice, and/or other data streams. Such wireless electronic devices may include, but are not limited to, personal computers, laptop computers, netbook computers, wireless music players, portable telephone communication devices, smart phones, tablets, digital televisions, etc.

Access points $20_1$-$20_4$ may be any devices that can associate with client devices 30 to transmit and receive data over wireless channels 35. In one embodiment, access points 20 may correspond to a network device such as a wired access port, a wireless access port, a switch, a router, or any combination thereof. For example, access point $20_1$ may be a router or any device that may be configured as a hotspot (e.g., a cell phone, a tablet, a laptop, etc.). Access points 20 may be communicatively coupled to other networks, such as external network 40, via a transmission medium to send and receive data. The data may include, for example, video data and/or voice data. The transmission medium may be a wired or a wireless connection. Access points 20 communicatively couple client devices 30 to other client devices 30 or other networks (e.g., external network 40) by forwarding data to or from client devices 30.

Figure 2:
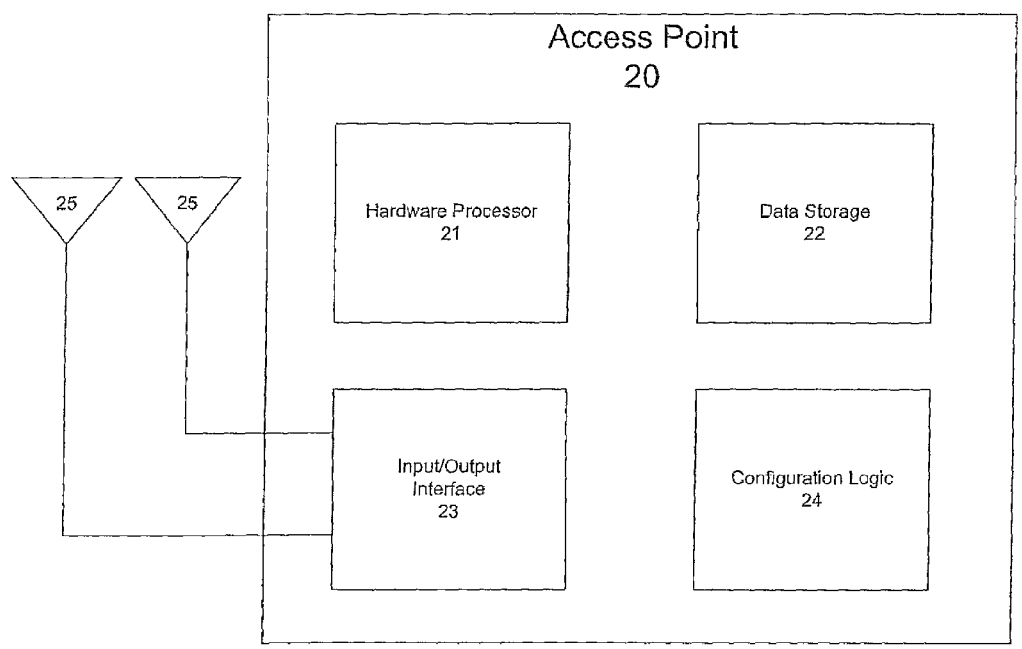
FIG. 2 shows a block diagram example of an access point in accordance with one or more embodiments.

FIG. 2 shows a block diagram example of an access point 20 in accordance with one or more embodiments. In response to instructions from a network device, e.g., controller 10 or some logic on access points 20 such as a virtual controller, each access point 20 may be a combination of hardware, software, and/or firmware that is configured to configure at least (1) channel widths between associated client devices 30, and (2) beamforming characteristics for transmission to client devices 30. Although illustrated as being configured by the controller 10, in some embodiments the access points 20 may be configured by logic on the access points 20 themselves. For example, a virtual controller on one or more access points 20 may perform configuration operations as described herein. In one embodiment as shown in FIG. 2, an access point 20 may be a network device that comprises one or more of: a hardware processor 21, data storage 22, an I/O interface 23, and device configuration logic 24. Other access points 20 within system 1 may be configured similarly or differently than the access point 20 shown in FIG. 2.

Data storage 22 of access point 20 may include a fast read-write memory for storing programs and data during access point 20's operations and a hierarchy of persistent memory, such as Read Only Memory (ROM), Erasable Programmable Read Only Memory (EPROM,) and/or Flash memory for example, for storing instructions and data needed for the startup and/or operations of access point 20. Data storage 22 stores data that is to be transmitted from access point 20 or data that is received by access point 20. In an embodiment, data storage 22 is a distributed set of data storage components.

In an embodiment, I/O interface 23 corresponds to one or more components used for communicating with other devices (e.g., client devices 30) via wired or wireless signals. I/O interface 23 may include a wired network interface such as an IEEE 802.3 Ethernet interface and/or a wireless interface such as an IEEE 802.11 WLAN interface. I/O interface 23 may communicate with client devices 30 over corresponding wireless channels 35. Wireless channels 35 may be of various widths, which may be dynamically changed during operation. For example, each wireless channel 35 may be dynamically configured to operate at 20 MHz, 40 MHz, 80 MHz, or 160 MHz. I/O interface 23 may include one or more antennas 25 for communicating with client devices 30, controller 10, and other wireless devices in network 1. For example, multiple antennas 25 may be used for forming transmission beams to client devices 30 through adjustment of gain and phase values for corresponding antenna 25 transmissions. The generated beams may avoid objects and create an unobstructed path to client devices 30 to possibly increase transmission capacity.

Hardware processor 21 is coupled to data storage 22 and I/O interface 23. Hardware processor 21 may be any processing device including, but not limited to a MIPS/ARM-class processor, a microprocessor, a digital signal processor, an application specific integrated circuit, a microcontroller, a state machine, or any type of programmable logic array.

In an embodiment, device configuration logic 24 includes one or more functional units implemented using firmware, hardware, software, or a combination thereof for configuring parameters associated with access point 20 and client devices 30. Although, device configuration logic 24 is shown as implemented on access point 20, one or more physical or functional components of device configuration logic 24 may be implemented on separate devices. The device configuration logic 24 may be configured to adjust (1) channel widths between access points 20 and client devices 30, and/or (2) beamforming characteristics between access points 20 and clients 30 as will be described in further detail below.

Controller 10 may be any device that can manage and configure access points 20 and/or client devices 30 operating in network 1. For example, as described in further detail below, controller 10 may configure one or more access points 20 to (1) adjust channel widths between an access point 20 and client devices 30 and/or (2) steer a client device 30 to an access point 20 that may provide increased capacity through the use of transmission beamforming. In one embodiment, controller 10 may correspond to a network device such as a wired access port, a wireless access port, a switch, a router, an access point, or any combination thereof. For example, controller 10 may be an access point 20 as described above in relation to FIG. 2.

Channel Width Configuration Based on Network Conditions

Channel widths for wireless channels 35 between access points 20 and client devices 30 in network 1 may be adjusted to alleviate congestion caused by a high density condition. For example, in a situation in which network 1 is lightly loaded (i.e., only a few client devices 30 connected to corresponding access points 20), network 1 may be operating with maximum supported channel bandwidth. In the case of 802.11 ac capable access points 20 and client devices 30, this may result in the use of 160 MHz wireless channels 35 between access points 20 and client devices 30. However, as network 1 begins to become congested or hints at the future possibility of becoming congested (e.g., a sudden increase in the number of client devices 30 in network 1 or an increase in airtime usage across one or more access points 20), channel widths for one or more wireless channel 35 may be reduced/scaled down across each access point 20 in network 1 to fairly distribute bandwidth resources amongst client devices 30 for each access point 20 and reduce/eliminate congestion.

In one embodiment, a metric may be calculated for the determination of the desired channel width (DCW) for each access point $20_i$. This DCW(i) may be the average channel width of the client devices 30 associated with each access point 20 are capable of implementing. In other embodiments, the DCW(i) for each access point 20 may be calculated based on different criteria. For example, DCW(i) may be the largest channel width supported among all of the associated client devices 30. DCW(i) may be a matrix of constant values, which may be calculated based on a target access point 20 suitable for each client device 30 as determined by one or more algorithms.

Based on the DCW(i) for each access point $20_i$, a channel width X(i) for each access point $20_i$ may be determined to alleviate a detected high density condition. Determination of the channel width X(i) for each access point $20_i$ may be formulated as a convex problem with a heuristic solution. The objective function for the convex problem may be given as:

$$\min \sum (DCW(i) - X(i))^2 \quad \text{Equation 1}$$

$$\text{such that Neighbors}(i) \leq \frac{\alpha_K}{\frac{X(i)}{K}} \times \beta$$

In Equation 1, K is the base or the lowest spectrum width supported on network 1 in megahertz. For example, K may be equal to 20, indicating that the lowest channel width supported on network 1 is 20 MHz. $\alpha_K$ denotes the number of channels when the spectrum in the regulatory domain is broken into units of K megahertz. The term $$\frac{\alpha_K}{\frac{X(i)}{K}}$$

represents the number of available channels based on the chosen channel width for an access point 30 (i.e., the X(i) for an access point 20$i$). $\beta$ denotes the frequency reuse factor. $\beta$ may be left at 1 so that when a high density mode in the network is detected, overlap will not occur in the spectrum.

In other embodiments, the objective function described above (Equation 1) may be translated into a linear problem by applying different constraints. For example, the convex problem may be given as:

$$\min \Sigma DCW(i) - X(i)$$

$$\text{such that } DCW(i) - X(i) \geq 0 \quad \text{Equation 2}$$

Figure 3A:
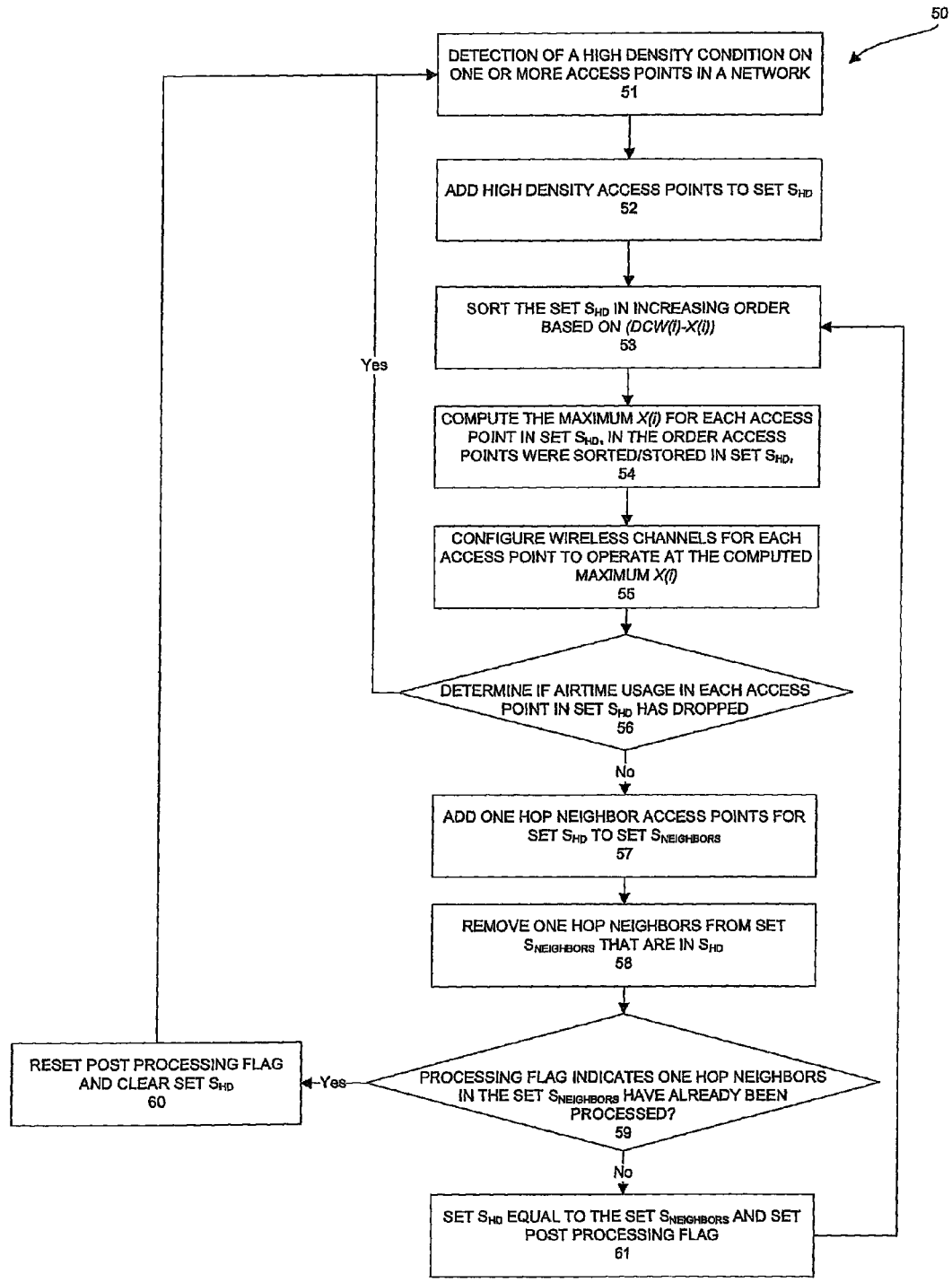

FIG. 3A shows a method 50 describing a heuristic solution to the above objective function (Equation 1). The method 50 may dynamically adjust channel widths of access points 20 across network 1 based on load and/or client device 30 capabilities. Method 50 may be performed by controller 10 and/or on one or more access points 20 in network 1.

Method 50 begins at operation 51 with the detection of a high density condition on one or more access points 20 in network 1. In one embodiment, a high density condition may be defined as the average airtime on a particular access point 20 being greater than a predefined threshold value (e.g., 80% airtime usage) and the access point 20 has not already been reduced/scaled down to a minimum channel width (e.g., 20 MHz for an access point 20 that supports 20/40/80/160 MHz channels widths). Network 1 may be initially set up such that channel widths for each access point 20 are originally set to the maximum configurable channel width (e.g., 160 MHz for an access point 20 that supports 20/40/80/160 MHz channels widths); however, after the detection of a high density condition, the channel widths for one or more access points 20 may need to be reduced/scaled down as described below to ensure airtime usage does not reach capacity.

Although method 50 is triggered based on the detection of a high density condition in network 1, in other embodiments other triggers may be used. For example, method 50 may commence at operation 51 upon the selection of a reset of network 1 by a network administrator or controller 10.

Upon detection of a network condition where multiple clients are actively connected with multiple access points in the network, e.g., a high density condition on one or more access points 20, operation 52 adds the high density access points 20 to the set $S_{HD}$. The set $S_{HD}$ will be processed as described below to determine a channel width X for each access point 20 within the set $S_{HD}$.

At operation 53, the set $S_{HD}$ is sorted in increasing order based on the value (DCW(i)–$X_c$(i)) for each access point 20 in the set $S_{HD}$, where $X_c$(i) may represent the current channel width of access point $20_i$, the previously set channel width of access point $20_i$, or a default channel width value (e.g., 160 MHz). As noted above, DCW(i) is a desired channel width of access point $20_i$. Sorting the set $S_{HD}$ in increasing order based on the value of (DCW(i)–$X_c$(i)) allows access points 20 that are more significantly overprovisioned (i.e., most separated from a desired channel width DCW) to be processed and reassigned more appropriate channel widths first. Any sorting algorithm may be used to sort $S_{HD}$ by controller 10, including the bubble sort, selection sort, and quick sort algorithms.

At operation 54, for each access point 20 in set $S_{HD}$, the maximum channel width $X_N$(i) based on reuse is computed such that:

$$X_N(i) < \frac{(K \times \alpha_K \times \beta)}{\text{Neighbors}(i)} \quad \text{Equation 3}$$

Neighbors(i) may indicate the number of one hop access point 20 neighbors relative to access point $20_i$ and $X_N$(i) represents a new channel width that potentially will alleviate the high density condition. In other embodiments in which a more conservative channel width is desired, Neighbors(i) may represent the number of two hop access point 20 neighbors relative to access point $20_i$. The value for $X_N$(i) should be computed for the channel widths available for a corresponding access point $20_i$. For example, for an access point 20$_i$ with available channel widths of 20/40/60/80/160 MHz, the value $X_N(i)$ should be calculated to correspond to one of these discrete values. If the computation does not arrive at a supported channel width for an access point 20, operation 54 may round down to the appropriate channel width limits. As noted above, operation 54 is performed for each access point 20 in set $S_{HD}$ such that each access point 20 in the set $S_{HD}$ is assigned a new channel width $X_N(i)$.

Based on the computations at operation 54, each access point 20 in the set $S_{HD}$ configures corresponding wireless channels 35 to operate at the new channel widths $X_N(i)$ at operation 55. In one embodiment, controller 10 may transmit the new channel widths $X_N(i)$ to corresponding access points 20 in the set $S_{HD}$ such that each access point 20 may adjust the channel width of associated wireless channels 35. In one embodiment, device configuration logic 24 and I/O interface 23 in each access point 20 adjusts channel widths of associated wireless channels 35 in response to receipt of new channel widths $X_N(i)$ from controller 10.

At operation 56, airtime across access points 20 in the set $S_{HD}$ is examined to determine if airtime usage has dropped for one or more access points 20. In one embodiment, airtime usage across all access points 20 in the set $S_{HD}$ may be compared against the threshold value that defines a high density condition (e.g., 80% airtime usage). If airtime usage has dropped below this threshold value and the high density condition has been overcome, method 50 may move to operation 51 to await the detection of another high density condition on an access point 20 in network 1. If at operation 56 airtime usage across the access points 20 in the set $S_{HD}$ does not drop below the threshold value, method 50 moves to operation 57 to perform post processing on access points 20 in set $S_{HD}$.

Post processing, in view of a remaining high density condition, begins at operation 57 with the determination of the one hop neighbors for each access point 20 in the set $S_{HD}$ and assignment of these one hop neighbor access points 20 to the set $S_{NEIGHBORS}$. One hop neighbors are access points 20 that are directly connected to a particular access point 20 through a wireless channel 35. For example, in FIG. 1 access point 20$_2$ has three one hop neighbors (i.e., access points 20$_1$, 20$_3$, and 20$_4$) while access point 20$_3$ has two one hop neighbors (i.e., access points 20$_2$ and 20$_4$).

After creating the set $S_{NEIGHBORS}$, operation 58 removes access points 20 from the set $S_{NEIGHBORS}$ that are also in $S_{HD}$. Removing access points 20 from $S_{NEIGHBORS}$ that are also in $S_{HD}$ allows method 50 to determine channel widths $X_N(i)$ for just one hop neighbors that have not already had their channel widths adjusted.

At operation 59, a post processing flag is checked to determine if the one hop neighbors in the set $S_{NEIGHBORS}$ have already been processed to adjust channel widths. Upon detection that the post processing flag has been previously set indicating that channel widths for these one hop neighbors have already be adjusted, method 50 moves to operation 60. At operation 60 the flag is reset, the sets $S_{HD}$ and $S_{NEIGHBORS}$ are cleared, and the method moves to operation 51 to await the detection of another high density condition on an access point 20 in network 1.

Upon the detection that the post processing flag has not been set, method 50 moves to operation 61. At operation 61, the set $S_{HD}$ is set to equal the set $S_{NEIGHBORS}$ and the operation moves to operation 53 to begin adjustment of the channel widths of the one hop neighbors, which are now stored in $S_{HD}$. Additionally, operation 61 may set the post processing flag to indicate that one-hop neighbors have been considered. This will ensure that the method 50 only considers the one-hop neighbors once as described above in relation to operation 59.

Using network 1 shown in FIG. 1, an example using method 50 will now be described. On detection of a high density condition at operation 51 across all access points 20$_1$-20$_4$ in network 1, operation 52 begins the heuristic analysis to evaluate how channel widths should be reassigned to each access point 20. In this example, each access point 20 is currently operating at a width of 80 MHz and only two channels are available. Based on client association, the desired channel width vector DCW may be equal to {40, 40, 80, 80} for access points 20$_1$-20$_4$, respectively. Hence, access points 20$_1$ and 20$_2$ should ideally have 40 MHz channel widths but they are currently overprovisioned while access points 20$_3$ and 20$_4$ have client devices 30 that are mostly capable of working at 80 MHz.

At operation 52, access points 20$_1$-20$_4$ are added to set $S_{HD}$ and this set is sorted in increasing order based on the $(DCW(i)-X_c(i))$ at operation 53. Since access points 20$_1$ and 20$_2$ are more significantly overprovisioned, access points 20$_1$ and 20$_2$ will be processed before access points 20$_3$ and 20$_4$.

At operation 54, the maximum channel width $X_N(i)$ based on reuse is computed such that Equation 3 is satisfied. In this example, an administrator may want access points 20 to work with no overlap (i.e., β=1) and eight 20 MHz channels are available (corresponding to the two 80 MHz channels). Based on these constraints and the above equation, a new/target channel width $X_N(i)$ is calculated for each access point 20. For instance, for access point 20$_1$:

$$X_N(1) < \frac{(20 \times 8 \times 1)}{1}$$

As a result of the above inequality, $X_N(1)$ must be set to a channel width less than 160 MHz. Since access point 20$_1$ supports 20/40/80/160 MHz channel widths, $X_1$ is set to 80 MHz to satisfy the above inequality.

For access point 20$_2$:

$$X_N(2) < \frac{(20 \times 8 \times 1)}{3}$$

As a result of the above inequality, $X_N(2)$ must be set to a channel width less than $$\frac{160}{3} \text{ MHz.}$$

Since access point 20$_2$ supports 20/40/80/160 MHz channel widths, $X_N(2)$ is set to 40 MHz to satisfy the above inequality. Values for access points 20$_3$ and 20$_4$ may be similarly calculated to arrive at both $X_3$ and $X_4$ being equal to 40 MHz.

Following the computation of new channel widths $X_N(i)$ for access points 20$_1$-20$_4$, operation 55 configures wireless channels 35 between access points 20 and associated client devices 30 to operate at the above computed channel widths. Based on the applied new channel widths, post processing at operations 56-61 in method 50 may be performed to ensure the high density condition has subsided.

FIG. 3B shows another method 62 for dynamically adjusting channel widths of access points 20 across network 1 based on load and/or client device 30 capabilities according to another embodiment. Method 62 may be performed by controller 10 and/or on one or more access points 20 in network 1.

Method 62 may be instigated by a triggering event detected by controller 10 and/or an access point 20. For example, method 62 may be triggered by controller 10 detecting a high density condition on one or more access points 20 in network 1. As noted above, in one embodiment, a high density condition may be defined as the average airtime on a particular access point 20 being greater than a predefined threshold value (e.g., 80% airtime usage) and channel widths of the access point 20 have not already been reduced/scaled down to a minimum channel width (e.g., 20 MHz for an access point 20 that supports 20/40/80/160 MHz channels widths). Although method 62 is triggered based on the detection of a high density condition in network 1, in other embodiments other triggers may be used. For example, method 62 may commence upon the selection of a reset of network 1 by a network administrator or controller 10.

Upon commencement of method 62, operation 63 determines characteristics of a plurality of client devices 30 currently associated with one of a plurality of access points 20 in the network 1. In one embodiment, the characteristics of the plurality of client devices 20 may include the number of client devices 30 associated with an access point 20 or the number of access points 20 in network 1. In one embodiment, the characteristics of the plurality of client devices 20 may include the capabilities of client devices 30. For example, operation 63 may determine the channel widths each client device 30 is capable of supporting, whether client devices 30 support beamforming transmissions, packet aggregation sizes supported by each client device 30, support for very high throughput (VHT) or high throughput (HT) communications, or other similar capabilities of client devices 30. In one embodiment, operation 63 determines characteristics of a plurality of client devices 30 currently associated with one of a plurality of access points 20 in the network 1 through the use of probe and association sequences.

Based on the characteristics of the plurality of client devices 30, operation 64 determines channel widths for wireless channels 35 between one or more access points 20 and one or more client devices 30. For example, operation 64 may determine a first channel width for wireless channels 35 between access point $20_1$ and associated client devices $30_1$, $30_2$, and $30_3$ and a second channel width for wireless channels 35 between access point $20_4$ and associated client devices $30_6$ and $30_7$. As noted above, the channel widths are determined based on the characteristics of the plurality of client devices 30 determined at operation 63. For example, the maximum channel width $X_N(i)$ for each access point $20i$ may be computed at operation 64 such that Equation 3 is satisfied.

In one embodiment, prior to determining channel widths method 62 may match/associate client devices 30 with access points 20 based on shared capabilities. In one embodiment, matching of client devices 30 with one or more candidate access points 20 may be performed based on characteristics of client devices 30 determined at operation 63. For example, client devices 30 that support beamforming transmissions may be matched or associated with access points 20 that also support beamforming transmissions. In addition to matching client devices 30 with access points 20 that support beamforming transmissions, client devices 30 may be matched/associated with access points 20 based on support for very high throughput (VHT) and/or high throughput (HT) communications. For example, client devices 30 that support VHT communications may be associated with one or more candidate access points 20 that also support VHT communications. Similarly, client devices 30 that support HT communications may be associated with candidate access points 20 that also support HT communications. This association of client devices 30 and access points 20 that share similar capabilities will improve potential capacity gains by reducing the likelihood of data transfer bottlenecks. In one embodiment, this association of client devices 30 with access points 20 is performed at operation 63 following characterization of the plurality of client devices 30. In one embodiment, a similar association of client devices 30 with access points 20 based on capability may be performed in method 50 upon the detection a triggering event/high density condition.

Based on the channel widths for wireless channels 35 between one or more access points 20 and one or more client devices 30 determined at operation 64, operation 65 configures corresponding access points 30 to provide network 1 access to one or more associated client device 30. In one embodiment in which controller 10 determines/computes new channel widths, controller 10 transmits the determined channel widths to corresponding access points 20. However, in some embodiments access points 20 determine/compute channel widths separate from controller 10. Access points 20 may thereafter adjust channel widths for wireless channels 35 to meet the channel widths determined at operation 64.

Using methods 50 or 62, controller 10 is able to dynamically adjust channel widths of access points 20 across network 1 based on load and client device 30 capabilities. Accordingly, high density conditions may be dynamically and intelligently addressed without the need for administrator intervention.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages are applicable.

Any combination of the above features and functionalities may used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   determining, by a network device, characteristics of a plurality of client devices associated with a first access point of a plurality of access points in a network;
   based upon the determined characteristics of the plurality of client devices, determining, by the network device, a first maximum channel width of a wireless channel for the first access point to use with the plurality of client devices associated with the first access point;

configuring, by the network device, the first access point to provide network access to the plurality of client devices associated with the first access point across the wireless channel up to the determined first maximum channel width, and
detecting a high density condition for one or more of the plurality of access points,
wherein determining the first maximum channel width further comprises determining the first maximum channel in response to detecting the high density condition.

2. The method of claim 1, further comprising:
based upon the determined characteristics of the plurality of client devices, determining a second maximum channel width of a wireless channel for a second access point of the plurality of access points to use with a plurality of client devices associated with the second access point; and
configuring the first access point to provide network access to the plurality of client devices associated with the first access point across the wireless channel up to the determined second maximum channel width.

3. The method of claim 1, wherein determining the first maximum channel width further comprises determining the first maximum channel width based on a number of other access points that is detectable by the first access point based on wireless signals received from the other access points by the first access point with a signal strength above a respective threshold value.

4. The method of claim 1, wherein determining characteristics of the plurality of client devices further comprises determining at least one of a number of the plurality client devices and capabilities of the plurality of client devices.

5. The method of claim 1, wherein detecting the high density condition further comprises:
detecting that the average usage for the one or more of the plurality of access points is above a predefined threshold value and that the current channel widths for the one or more of the plurality of access points are not at a minimum supported channel width.

6. The method of claim 1, wherein determining the first maximum channel width further comprises:
scaling down a first channel width to the first maximum channel width that reduces airtime usage for the plurality of client devices associated with the first access point.

7. The method of claim 6, wherein determining the first maximum channel width further comprises:
sorting the plurality of access points in increasing order based on a level of overprovisioning a channel width for each of the plurality of access points; and
determining a maximum channel width for each of the plurality of access points, including the first access point, in sequential order.

8. The method of claim 7, wherein the level of overprovisioning for an access point is the difference between a desired channel width for the access point and the current channel width for the access point.

9. The method of claim 6, further comprising:
determining that airtime usage for each of the plurality of access points has not been reduced; and
adjusting the channel widths of one-hop neighbor access points for the plurality of access points such that airtime usage for each of the one-hop neighbor access points is reduced while channel widths are maximized.

10. The method of claim 1, wherein determining the first maximum channel width further comprises determining the first maximum channel width to be less than $$\frac{(K \times \alpha_K \times \beta)}{\text{Neighbors}},$$

wherein Neighbors indicates the number of one hop neighbors for the first access point, K is the lowest spectrum width supported on the wireless network, $\alpha_K$ denotes the number of channels when the spectrum is broken into units of K, and $\beta$ is the frequency reuse factor.

11. An apparatus comprising:
a processor; and
a memory on which is stored machine readable instructions that are to cause the processor to:
determine characteristics of a plurality of client devices associated with a first access point of a plurality of access points in a network;
based upon the determined characteristics of the plurality of client devices, determine a first maximum channel width of a wireless channel for the first access point to use with the plurality of client devices associated with the first access point;
configure the first access point to provide network access to the plurality of client devices associated with the first access point across the wireless channel up to the determined first maximum channel width;
detect a high density condition for one or more of the plurality of access points by detecting that the average usage for the one or more of the plurality of access points is above a predefined threshold value and that the current channel widths for the one or more of the plurality of access points are not at a minimum supported channel width; and
determine the first maximum channel in response to the high density condition being detected.

12. The apparatus of claim 11, wherein the machine readable instructions are further to cause the processor to determine a second maximum channel width of a wireless channel for a second access point of the plurality of access points to use with a plurality of client devices associated with the second access point based upon the determined characteristics of the plurality of client devices and to configure the second access point to provide network access to the plurality of client devices associated with the second access point across the wireless channel up to the determined second maximum channel width.

13. The apparatus of claim 11, wherein to determine the first maximum channel width, the machine readable instructions are further to cause the processor to determine the first maximum channel width to be less than $$\frac{(K \times \alpha_K \times \beta)}{\text{Neighbors}},$$

wherein Neighbors indicates the number of one hop neighbors for the first access point, K is the lowest spectrum width supported on the wireless network, $\alpha_K$ denotes the number of channels when the spectrum is broken into units of K, and $\beta$ is the frequency reuse factor.

14. A non-transitory computer readable storage medium on which is stored machine readable instructions that when executed by a processor cause the processor to:
determine characteristics of a plurality of client devices associated with a first access point of a plurality of access points in a network;

based upon the determined characteristics of the plurality of client devices, determine a first maximum channel width of a wireless channel for the first access point to use with the plurality of client devices associated with the first access point;

configure the first access point to provide network access to the plurality of client devices associated with the first access point across the wireless channel up to the determined first maximum channel width;

detect a high density condition for one or more of the plurality of access points by detecting that the average usage for the one or more of the plurality of access points is above a predefined threshold value and that the current channel widths for the one or more of the plurality of access points are not at a minimum supported channel width; and determine the first maximum channel in response to the high density condition being detected.

15. The non-transitory computer readable storage medium of claim 14, wherein the machine readable instructions are further to cause the processor to determine a second maximum channel width of a wireless channel for a second access point of the plurality of access points to use with a plurality of client devices associated with the second access point based upon the determined characteristics of the plurality of client devices and to configure the second access point to provide network access to the plurality of client devices associated with the second access point across the wireless channel up to the determined second maximum channel width.

16. The non-transitory computer readable storage medium of claim 14, wherein to determine the first maximum channel width, the machine readable instructions are further to cause the processor to determine the first maximum channel width to be less than $$\frac{(K \times \alpha_K \times \beta)}{\text{Neighbors}},$$

wherein Neighbors indicates the number of one hop neighbors for the first access point, K is the lowest spectrum width supported on the wireless network, $\alpha_K$ denotes the number of channels when the spectrum is broken into units of K, and $\beta$ is the frequency reuse factor.

* * * * *